Sept. 10, 1935.  C. A. CAMPBELL  2,013,743
AIR BRAKE
Filed Feb. 12, 1932  5 Sheets-Sheet 1
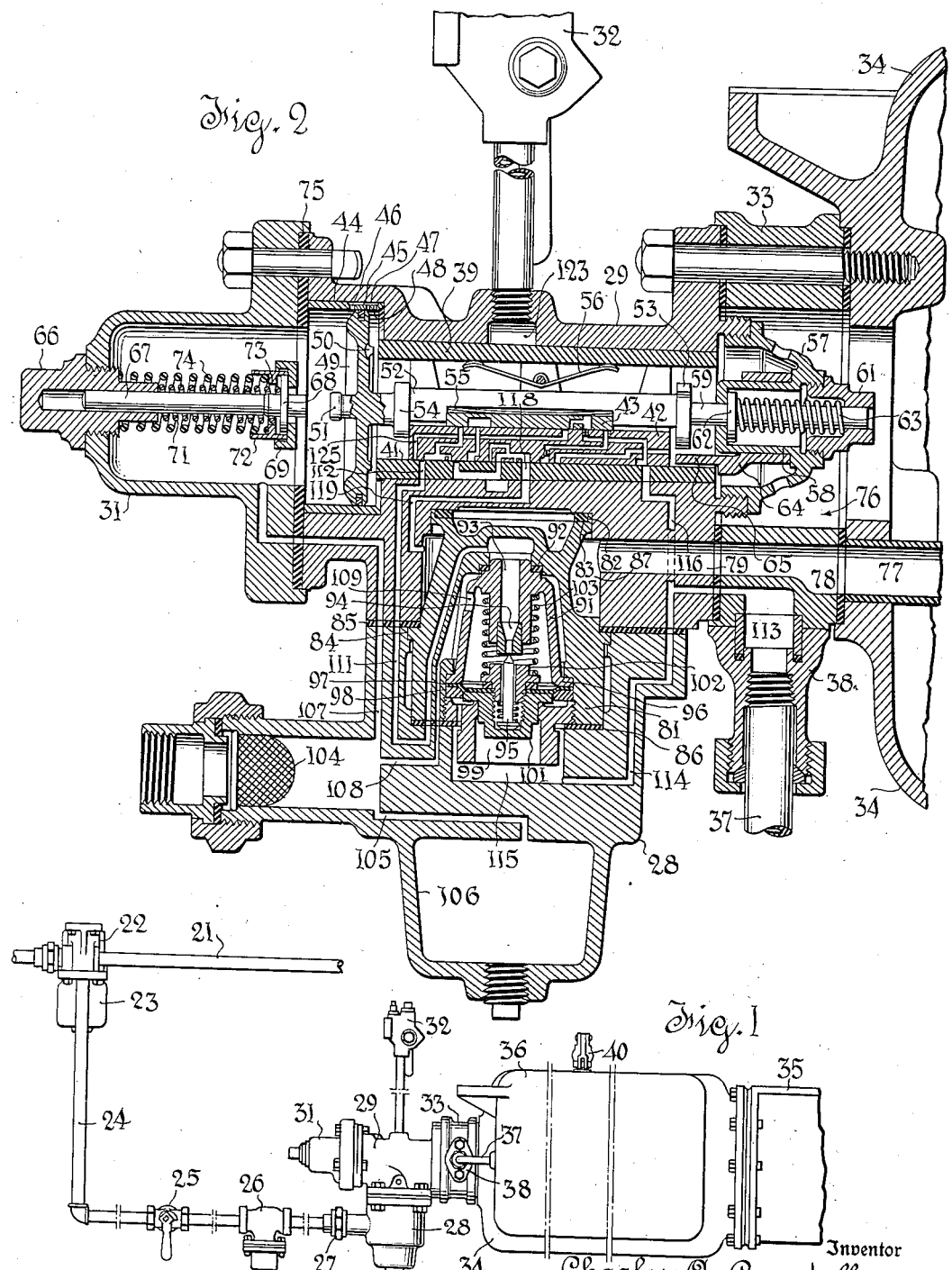
Inventor
Charles A. Campbell
By Dodge and Ims
Attorneys Sept. 10, 1935.　　　　　C. A. CAMPBELL　　　　　2,013,743
AIR BRAKE
Filed Feb. 12, 1932　　　　5 Sheets-Sheet 2
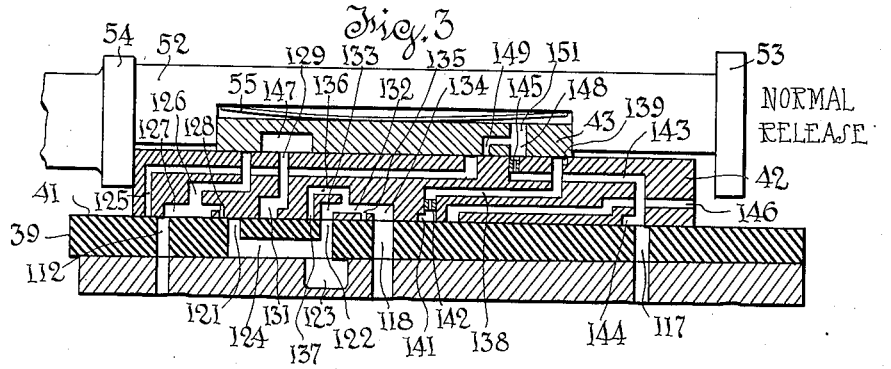
Fig. 3 — NORMAL RELEASE
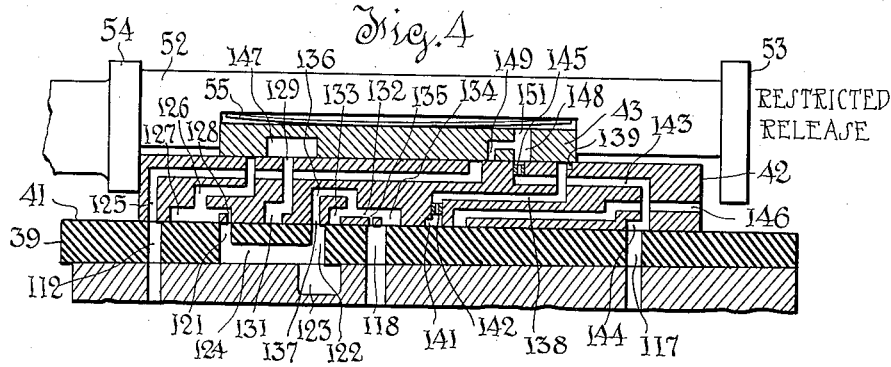
Fig. 4 — RESTRICTED RELEASE
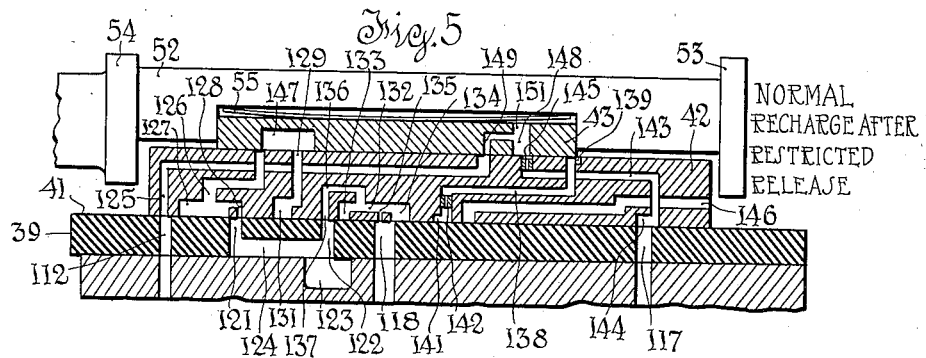
Fig. 5 — NORMAL RECHARGE AFTER RESTRICTED RELEASE
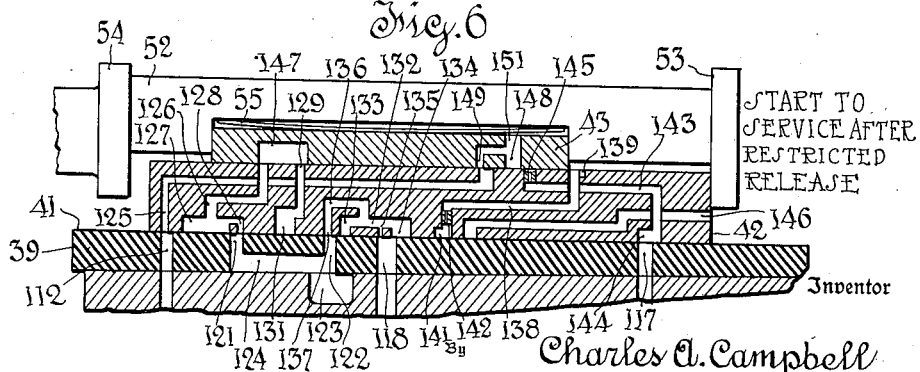
Fig. 6 — START TO SERVICE AFTER RESTRICTED RELEASE
Inventor
Charles A. Campbell
Attorneys

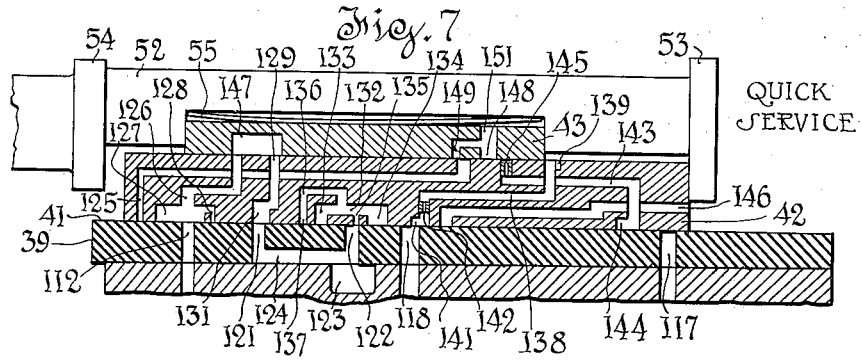
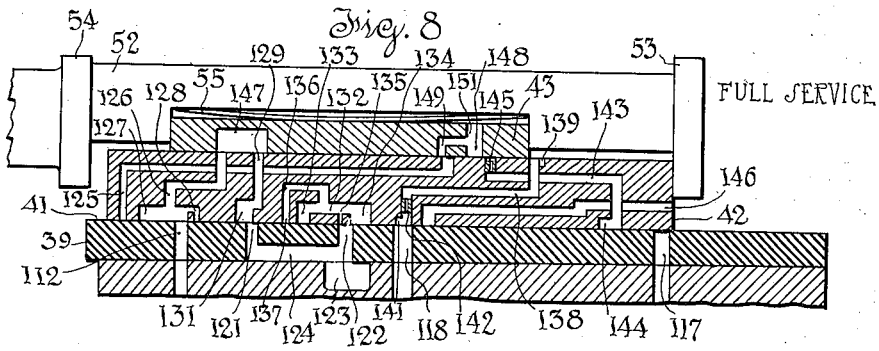
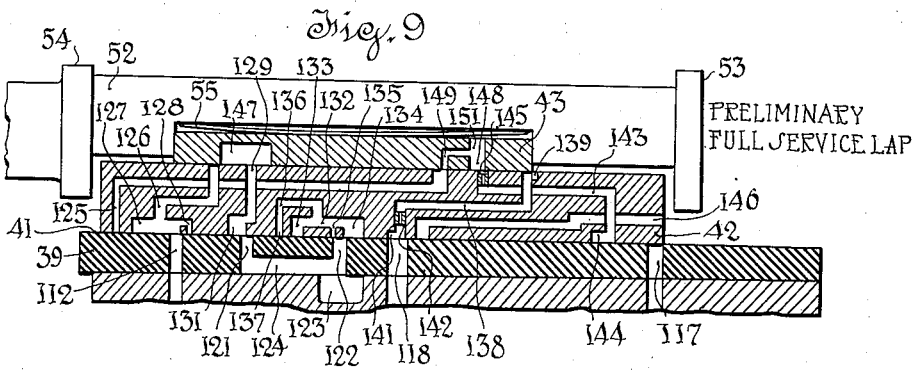
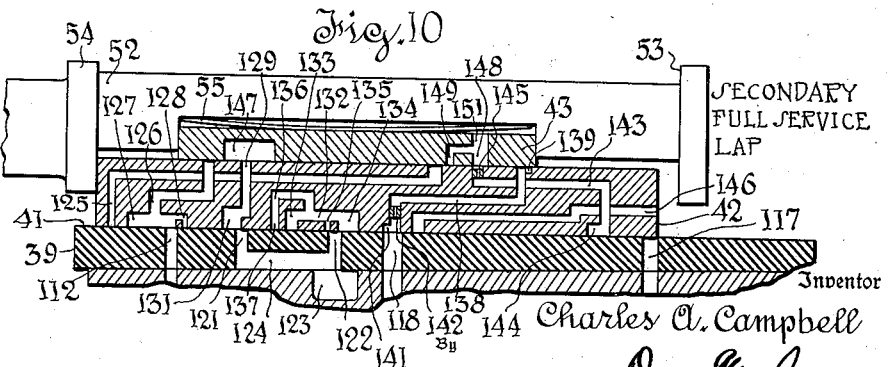

Sept. 10, 1935.   C. A. CAMPBELL   2,013,743
AIR BRAKE
Filed Feb. 12, 1932   5 Sheets-Sheet 4

Inventor
Charles A. Campbell
By
Attorneys

Sept. 10, 1935.　　　　C. A. CAMPBELL　　　　2,013,743
AIR BRAKE
Filed Feb. 12, 1932　　　5 Sheets-Sheet 5
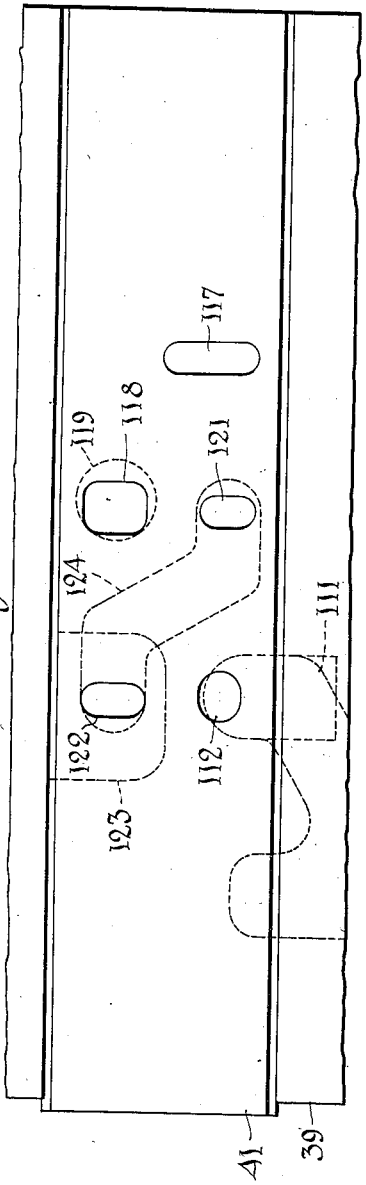
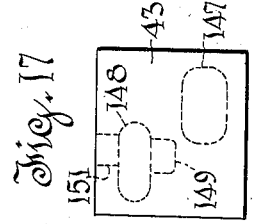
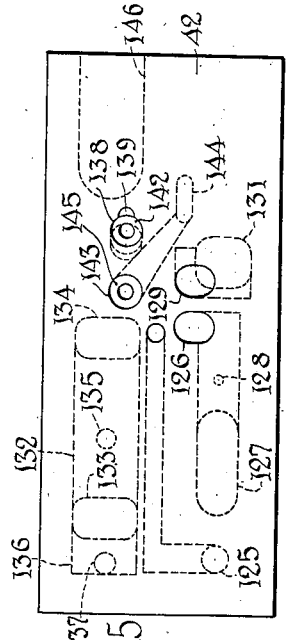
Inventor
Charles A. Campbell
By Dodge and Sons
Attorneys Patented Sept. 10, 1935

2,013,743

UNITED STATES PATENT OFFICE 2,013,743

AIR BRAKE

Charles A. Campbell, Watertown, N. Y., assignor to The New York Air Brake Company, a corporation of New Jersey Application February 12, 1932, Serial No. 592,642

31 Claims. (Cl. 303—35)

This invention relates to air brakes, and particularly to triple valves.

The invention is particularly applicable to that type of triple valve described and claimed in my prior application Serial No. 524,740, filed March 23, 1931. Characteristic features of such prior application are the use of two reservoirs, an auxiliary reservoir and a supplemental reservoir; the control of charging of and equalization between said reservoirs by the triple slide valve and graduating valve; the use of auxiliary reservoir pressure in service and of auxiliary and supplemental reservoir pressures in emergency; the use of a quick service limiting valve in conjunction with a combined quick service and stabilizing port; and the use of a stabilizing port rendered effective by motion of the slide valve to restricted release position and the subsequent return of the triple piston and graduating valve to normal recharge position. Consequently these features, though disclosed in the present application in a particular form, are not herein claimed broadly.

The prior application also includes a mechanism providing a stage build-up for brake cylinder pressure. Such mechanism is not illustrated in the present application, but it is now known in the art that devices of this sort may be interposed in the path of flow from the brake cylinder port of the triple valve to the brake cylinder. The presence or absence of such a device is immaterial to the features here claimed.

The structure of said prior application demonstrated in rack tests, highly desirable operative characteristics on trains as long as 150 cars all equipped with the new valve. It also developed satisfactory operating characteristics in 150 car trains when present standard K2 valves were inserted either singly or in groups at various different points in the train. It was found, however, that with such mixed trains when the quick service venting function was materially intensified beyond what was contemplated originally (as was done in later tests to speed up the propagation of the service reduction throughout the brake pipe) there was an increasing tendency toward unsatisfactory action of the train as a whole in two respects. The relatively slow venting action of the K2 triples set up differential pressures in the brake pipe when a considerable number of K2 triples were grouped together, and this resulted in surging flow in the pipe and occasional undesired release of certain triple valves. The brake cylinder pressures attained in different portions of the train as a result of light reductions of brake pipe pressures differed in greater degree than was thought desirable.

The present invention overcomes these difficulties in a satisfactory manner. The novelty over the prior application above identified resides chiefly in the porting of the slide valve and graduating valve and their respective seats.

Generally stated, the present invention is characterized by the use of a relatively large quick service venting port, leading to atmosphere, to secure rapid propagation of the service pressure drop throughout the brake pipe, in conjunction with a relatively small service port so coordinated as to flow rate with the quick service venting port that even in light application the venting flow will be terminated by the quick service limiting valve before the triple slide valve starts to move toward lap position. Furthermore, the lapping action of the valve is made slow and gradual. The effect is to insure a definite quick service drop in brake pipe pressure and yet afford capacity to vent air flowing in a brake pipe from any block of grouped K type valves toward the improved valves. The attainment of standardized quick service pressure drop and the venting of the brake pipe to atmosphere, rather than to the brake cylinder, permit avoidance of conditions which, under certain circumstances, resulted in the uneven brake cylinder pressures.

Comparatively speaking, it is easy to devise a triple valve which when used exclusively in a train will give desirable operating conditions including rapid service propagation, but it must be remembered that for twenty years, and perhaps longer, after the contemplated change to a new type of valve has been made, there will be in the United States substantial numbers of the present standard K type triple valves still in service. The improvements produced by the present invention meet the requirement of satisfactory working in trains with K type valves in addition to improving the general operation of the new valve when used exclusively in trains.

Another important feature of the valve here disclosed is that when the valve moves to what may be called emergency lap position after an emergency application, it does not completely lap the ports, but leaves the auxiliary reservoir, supplemental reservoir, and brake cylinder connected with each other through restricted communications. The practical importance of this is that when an emergency application must be released by bleeding the reservoirs, this can be accomplished through a single valve. If the triple valve were moved to an actual lap position, as the auxiliary reservoir is bled to release the brakes, it would be impossible completely to vent the supplemental reservoir and brake cylinder unless additional bleed valves were used. By insuring that these three volumes communicate in emergency lap position, a single bleed valve placed, for example, on the auxiliary reservoir, will serve to vent all three.

The atmospheric quick service vent and the quick service limiting valve are disclosed and claimed in a prior application Serial No. 517,606, filed February 21, 1931, while the slow lap feature and the arrangement for preventing creeping from lap to quick service position are more broadly claimed in application Serial No. 593,635, filed February 17, 1932.

The preferred embodiment of the invention will now be described in connection with the accompanying drawings, in which,—

Fig. 1 is an elevation, partly broken away, showing the triple valve assembled with a portion of the brake pipe, emergency vent valve, auxiliary and supplemental reservoirs, brake cylinder and related accessory apparatus.

Fig. 2 is a vertical axial section of the triple valve, together with the filler piece to which the supplemental reservoir is connected, and a portion of the auxiliary reservoir, the parts being shown in normal release position.

Fig. 3 is an enlarged sectional view similar to a portion of Fig. 2 and showing the valve seat, triple slide valve, graduating valve and piston stem in normal release position.

Fig. 4 is a similar view showing the parts in restricted release and recharge position.

Fig. 5 is a similar view showing the positions assumed by the parts in normal recharge following restricted release.

Fig. 6 is a similar view showing the parts starting toward service position from the position of normal recharge following restricted release.

Fig. 7 is a similar view showing the parts in quick service position.

Fig. 8 is a similar view showing the parts in full service position.

Fig. 9 is a similar view showing the parts in preliminary service lap position.

Fig. 10 is a similar view showing the parts in service lap position.

Fig. 14 is a plan view of the seat for the triple slide valve.

Fig. 15 is a plan view showing the upper face of the triple slide valve.

Fig. 16 is a view of the lower face of the triple slide valve.

Fig. 17 is a plan view showing the top of the graduating valve.

Fig. 18 is a view of the lower face of the graduating valve.

Figure 11:
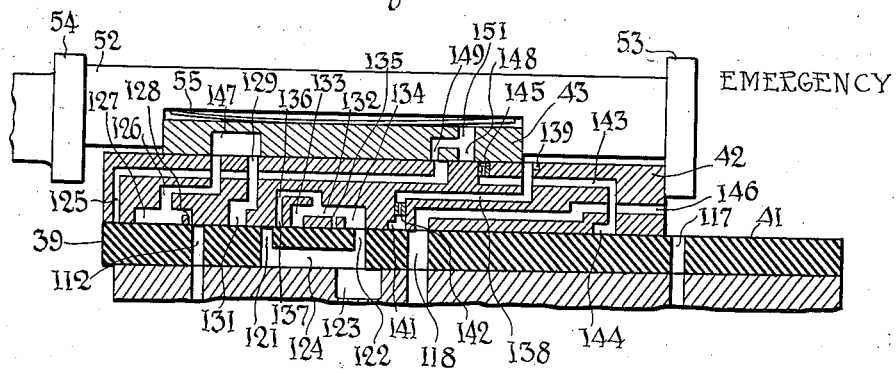
Fig. 11 is a similar view showing the parts in emergency position. (This position is assumed also when an overreduction of brake pipe pressure occurs, i. e., say more than fourteen pounds below equalization with the auxiliary reservoir.)

Figs. 2 to 13 inclusive are diagrammatic views to the extent that they are drawn as if all the ports lay in the same plane. Obviously a more compact arrangement can be secured by other but functionally equivalent locations of the ports. The preferred arrangement is shown in Figs. 14 to 18, inclusive, which show the seat and the valves drawn substantially to scale with the best port locations now known.

Referring first to Fig. 1, a portion of the brake pipe is indicated at 21. This is connected from car to car by the usual brake pipe hose, and pressure in the brake pipe is controlled by an engineer's brake valve of any suitable type located in the locomotive.

Interposed in the brake pipe is a bracket fitting 22 which offers a connection for an emergency vent valve of the pipeless type, generally indicated by the reference numeral 23. This brake pipe vent valve may be of any preferred construction, but is preferably of that type which responds to a brake pipe reduction occurring at a rapid rate. When the valve responds it vents the brake pipe 21 preferably directly to atmosphere.

The function of the vent valve is merely to assist in propagating throughout the length of the brake pipe a sudden or emergency pressure reduction. Its response is wholly independent of the response of the triple valve.

Also connected to the bracket fitting 22, and communicating therethrough with the brake pipe 21, is the branch pipe 24. This communicates through a cutout cock 25, centrifugal dust separator 26, and union 27, with the lower case or body 28 of a triple valve whose main body appears at 29. This triple valve has the usual front cap 31 and retainer 32 and is mounted against a filler piece 33 which in turn is seated on one end of the auxiliary reservoir 34. The brake cylinder 35 is mounted on the other end of the auxiliary reservoir 34. A supplemental reservoir is shown at 36 and is connected by the pipe 37 and fitting 38 with the filler piece 33. The purpose of the filler piece 33 is to afford a mount for the triple valve which will connect it with both reservoirs and the brake cylinder. The reservoir 34 is provided with the usual bleed valve 40.

Referring now to Fig. 2, the body 29 is provided with the usual valve chamber bushing 39 which is formed with the usual flat valve seat 41 for the triple slide valve 42. The graduating valve 43 is slidable on top of the slide valve on which its seat is formed. The cylinder bushing 44 is of usual construction except that it is formed on its outer side with a groove 45 which serves to connect three feed ports, a relatively large port 46, and two smaller ports 47 and 48, whose total capacity approximates the capacity of the port 46, and whose individual capacities are in proportion to the volumes of the reservoirs 36 and 34.

The triple piston appears at 49 and has the usual bead with a narrow slot 50 which seats on the end of the slide valve bushing and determines the rate of restricted charging. There is the usual graduating button 51. The piston stem 52 has a guiding spider 53 at its end, and between this spider and a collar 54 the slide valve 42 has limited lost motion. The graduating valve 43 is closely confined in a notch in the stem 52 and is held seated by a leaf-spring 55. A bow-spring 56 seats the valve 42.

Threaded into the inner end of the body 29 is a ported member 57 which has a central hub 58 serving as a guide for the forward end of the retard stop 59. At the rear end the stem 59 is guided in a bushing 61 threaded into the member 57. It is limited in its forward motion by a flange or collar 62 and is urged forward by a relatively light coil spring 63 which surrounds the stem and is confined between the bushing 61 and the collar 62. Slidably mounted on the hub 58 is a sleeve 64 which carries a lug 65. This lug limits the inward motion of the slide valve 42.

The retard stop 59 coacts solely with the end of the stem 52. Consequently, at the end of restricted release and recharge it moves merely the piston stem 52, piston 49 and graduating valve 43, the slide valve 42 remaining unaffected in its innermost or restricted release position.

The front cap 31 has the usual plug 66 which serves as a guide for the graduating stem 67. This has near its forward end the usual collar 68 which seats on a stop 69 formed in the front cap. A light graduating spring 71 surrounds the stem 67 and is confined between the nut 66 and the collar 68. Also seated against the stop 69 is a ring 72 having an inward extending flange 73. This flange is engaged by the collar 68 when the stem 67 moves back slightly and then brings into action a second and heavier graduating spring 74 which is confined between a portion of the nut 66 and the inward flange 73 on ring 72.

The parts are so arranged that button 51 engages the end of stem 67 without compressing either spring in quick service position; compresses spring 71 until collar 68 engages flange 73 in full service position, and overpowers both springs until the piston 49 seats on the front cap gasket 75 in emergency (and overreduction) position.

It will be observed that the guide member 57 projects into a port 76 formed through the filler piece 33 and serving to connect the valve chamber within the bushing 39 with the interior of the auxiliary reservoir 34. The brake cylinder pipe 77 which extends through the auxiliary reservoir 34 to the brake cylinder 35 (this being standard practice in freight brakes) communicates with a passage 78 in the filler piece 33 which registers with the brake cylinder passage 79 in the body 29.

The body 29 may be a standard body for an ordinary K-type triple valve now standard and extensively used on North American railways. This body has in its lower portion a chamber, which in the K-triple valve is used for the emergency piston. This chamber, in conjunction with a registering chamber formed in the special lower case 28, is used in the present valve to receive a quick service limiting valve body 81. This body 81 is formed with a flange 82 to confine the ring gasket 83 which forms a seal between the upper end of the body 81 and the upper end of the recess in the body 29. At about midlength the body 81 carries an annular flange 84 which seats in a counter-sink in the lower case 28 and which seals against the gasket 85 interposed between the lower case 28 and the triple valve body 29. The lower end of the body 81 seats on an annular ported gasket 86 and thus seals with the lower end of the recess in the lower case 28.

The brake cylinder passage 79 communicates with an annular passage 87 which surrounds the upper portion of the body 81 and to which the brake cylinder port 118 in the triple slide valve seat leads by way of passage 119.

The body 81 is in the form of an inverted cup and inserted through its lower end is a second cup-like member 91. This makes a tight joint by means of the gasket 92, with the body 81 and has a central passage 93 leading from the ported valve seat 94 for the pin valve 95. The lower end of the member 91 is formed with a rounded annular seat 96 for a flexible diaphragm 97. A rounded diaphragm-clamping ring 98 engages the lower side of the diaphragm 97 and is held in place by a ported annular nut 99. The pin valve 95 is seated in a central hub made up of a thrust member 101 and a nut 102 threaded into the member 101 through the center of the diaphragm. The member 101 also coacts with the nut 99 to limit downward motion of the diaphragm.

The pin valve 95 is shown as of a construction familiar in governor tops and feed valves, but may be of any suitable type in which the pin valve is free to aline itself with the seat 94. A coiled compression spring 103 is confined between the members 91 and 102 and acts to urge the diaphragm 97 downward, that is, in a direction to open valve 95.

Branch pipe 24 communicates through the union 27 and strainer 104 with three passages. Of these passages 105 leads to the drain cup 106; passage 107 leads to the space to the left of the triple piston 49; and passage 108 leads to the space outside the member 91 and thence through the opening 109 to the space above the diaphragm 97. When the valve 95 is unseated, this space is in communication through the seat 94 and bore 93 with the passage 111 which leads through the members 81, 28 and 29 to the quick service port 112 in the slide valve seat.

From the space 113 with which the supplemental reservoir pipe 37 communicates there is a passage 114 which leads to the space 115 beneath the diaphragm 97. There is also a passage 116 which connects with the supplemental reservoir port 117 in the slide valve seat.

Also formed in the slide valve seat 41 in bushing 39 is the brake cylinder port 118 already described as connected by passage 119 with the chamber 87 and brake cylinder passage 79. There are in the seat 41 two exhaust ports 121 and 122 which are connected together and to a groove 123 in body 29 by means of a groove port 124 formed in the outer surface of bushing 39. The groove port 123 leads around the bushing 39 and communicates with the retainer pipe upon which the retainer 32 is mounted.

The slide valve 42 has a through port 125, termed the stabilizing port, which extends from the lower to the upper face of the valve. This port is so located that when the slide valve 42 is in restricted release position (see Figs. 4 and 5) it registers with the port 112 in the seat 41, and when the piston moves back to normal recharge position after restricted release, the upper end of the port 125 registers with a port in the graduating valve (described hereinafter) to form a stabilizing connection (see Fig. 5). The port 125 is functionless except in the position of Figs. 5 and 6.

There is a through port 126, called the brake pipe quick service port, which extends through the valve from the top face to the bottom, and terminates in the lower face of the valve in an enlargement or recess 127 of considerable superficial area. There is a small extension of the recess 127 which communicates with a restricted port 128 also terminating in the lower face of the slide valve.

There is a third through port 129 in the slide valve, known as the atmospheric quick service port. This port terminates on the lower face of the valve in an enlarged cavity 131 also of considerable superficial area. Formed in the body of the slide valve 42 is an exhaust port 132 which terminates in two exhaust cavities 133 and 134 each of considerable superficial area, which in normal release position aline with the exhaust seat port 122 and the brake cylinder port 118 respectively. For an idea of the area of ports 127, 131, 133, and 134, as compared to the area of the lower face of the slide valve, see Fig. 16.

Branching off from the exhaust port 132 is a small loading port 135 terminating in the lower face of the slide valve. There is also a second branch exhaust passage 136 which terminates in a small port 137 in the lower face of the slide valve. The port 137 is termed the restricted release port and the capacity of the port is such that a much slower release of air from the brake cylinder will take place when this port registers with port 122 (see Figs. 4, 5, and 16).

There is a through port 138 extending from the upper to the lower face of the slide valve and known as the service port. This port is formed at its upper end with a narrow extension or tail port 139 designed to permit restricted flow of auxiliary reservoir air to the brake cylinder in preliminary lap position and in graduating brakes on after the initial brake pipe reduction. At the lower end the port is formed with an enlargement or extension 141 which registers with the brake cylinder port to permit initial flow to the brake cylinder in quick service position (see Fig. 7). A flow restricting choke 142 is pressed into the port 138 to control the maximum flow rate therethrough.

There is a supplemental reservoir charging port 143 which extends from the upper to the lower face of the slide valve 42. This valve terminates in an elongated cavity or recess 144 in the lower face of the slide valve so as to register with port 117 in both release positions. The maximum flow rate through the port is controlled by a choke 145.

There is also an emergency port 146 which extends from the right hand or inner end of the slide valve 42. In the actual construction shown in Figs. 15 and 16, the port 146 takes the form of a groove milled in the lower face of the slide valve and extending from the inner end thereof. In the diagrammatic views it is shown as a port extending through the body of the valve in order to permit a distinction between it and the charging port 143.

The graduating valve 43 has in its lower face a cavity 147, which connects the ports 126 and 129 when the graduating valve 43 is in its inner or right hand position on slide valve 42. This connection is effective for quick service flow only in quick service position (Fig. 7) and full service (Fig. 8) in which position ports 126 and 129 register with seat ports 112 and 121. While the quick service vent path remains open in full service, flow is limited by valve 95 which gradually closes as brake pipe pressure falls to a chosen value (i. e., a pressure some chosen amount, say five pounds per square inch less than the pressure in the supplemental reservoir 36). The connection of ports 126 and 129 by cavity 147 is useful in normal recharge after restricted release, and in start to service from such position as it vents port 129 through ports 126 and 121, thus venting to atmosphere a large area on the lower face of the slide valve to load the valve and develop additional resistance to its motion. Start to service from normal release position similarly effects unloading of the slide valve as will be explained hereafter.

The graduating valve has in its lower face a recess 148 having an extension 149 which registers with the stabilizing port 125 in normal recharge after restricted release (Fig. 5) and during start of movement therefrom toward service (Fig. 6). A port 151 connects recess 148 and extension 149 with the space within valve chamber bushing 39. In Figs. 1–13 the port 151 is shown extending through the top of the valve, but actually (see Figs. 17 and 18) it extends to a lateral edge of the valve to insure free flow and the wing on that side of the slide valve is suitably modified to permit free flow to the lateral port.

DESCRIPTION OF OPERATION

*Normal release position (Figs. 2 and 3)*

On a gradual rise of brake pipe pressure, the piston 49 moves inward until arrested by the retard stop 59 without compression of the spring 63. In this position passages 47 and 48 are both open and brake pipe air flows around the edge of the piston to the slide valve chamber and thence to the auxiliary reservoir at the normal charging rate.

The recess 144 overlies the port 117 and flow occurs between the slide valve chamber and the supplemental reservoir at rates controlled by the relation of pressures and the capacity of the choke port 145. As the supplemental reservoir is not drawn upon in service, the initial flow will commonly be from the supplemental toward the auxiliary reservoir, thus assisting in charging the auxiliary reservoir at a rate which is slow enough to avoid any risk of delaying motion to restricted release and recharge position under the conditions described below. After equalization of pressure between the two reservoirs they will be charged concurrently.

The exhaust ports 133 and 134 register with the ports 122 and 188, thus giving a free exhaust of brake cylinder air.

It will be observed that the cavity 127 overlies port 112 so that this cavity is at brake pipe pressure. Furthermore, initial movement of the graduating valve 43 to the left would cause cavity 147 to bridge ports 126 and 129, thus subjecting cavities 127 and 131 both to brake pipe pressure, tending to reduce the effective pressure with which the slide valve 42 is held to its seat. In this way the valve 42 is unloaded or conditioned for relatively free movement toward quick service position. It is an important operative characteristic of this valve that upon initial movement of the graduating valve 43 and piston 49 in a service direction from normal release position, the slide valve is unloaded and hence in condition for relatively free motion.

*Restricted release and recharge position (Fig. 4)*

Upon a rapid rise of brake pipe pressure, such as occurs in the forward cars of a train, the piston 49 moves inward and overpowers the spring 63 so that the charging flow is reduced to the capacity of the port 48 and groove 50.

Cavity 144 still registers with the port 117 so that the charging flow to the supplemental reservoir continues as in normal release position. The stabilizing port 125 is moved into register with the seat port 112 but flow through the port 125 is interrupted by the graduating valve 43.

The small extension port 128 now overlies the quick service seat port 121 so that cavity 127 is at atmospheric pressure. The brake cylinder port 108 is still connected to the exhaust port 122 but the communication is through the restricting port 137 so that the brake cylinder is exhausted gradually to atmosphere.

*Normal release position (Figs. 2 and 3)*
*lease (Fig. 5)*

After appropriate equalization has been reached between the brake pipe and the auxiliary reservoir pressures, the retard stop spring 63 shifts the piston 49 and graduating valve 43 outward and the parts assume the position shown in Fig. 5 in which the charging rate from the brake pipe to the auxiliary reservoir is restored to the aggregate capacity of the ports 47 and 48. The slide valve 42 is not moved and the cavity 148 still registers with the upper end of port 143, so that charging flow to the supplemental reservoir is still that determined by the flow capacity of choke 145.

The outward motion of the graduating valve 43 causes cavity 147 to connect ports 126 and 129, and as the port 128 remains in register with the port 121, all the ports named are at atmospheric pressure. This means that the relatively large areas of the recesses 127 and 131 (as well as the recesses 133 and 134) are at atmospheric pressure so that the valve 42 is held to its seat with considerable force and develops considerable frictional resistance against motion toward service position.

An important characteristic of the triple valve here described and claimed is that the triple slide valve 42 must move when the triple valve shifts from any release and recharge position to quick service position. Those valves which move from normal release position move freely because the slide valve 42 is unloaded. Those valves which move to quick service position from restricted release and recharge position, or from normal recharge after restricted release, move with considerable resistance because the slide valve 42 is loaded.

The stabilizing port 125 still registers with the seat port 112 since the slide valve is not moved from the position of Fig. 4 and the motion of the graduating valve 43 outward causes extension 149 to register with the upper end of port 125. In this manner is established a by-pass connection between the brake pipe and the auxiliary reservoir. This connection is supplemental to that existing around the edge of the piston 49 by way of the ports 45, 46, 47, 48. This by-pass will permit flow back and forth and further stabilizes the piston 49 against response to minor pressure variations. The aggregate effect of the loading of the recesses 127, 131, 132, and 134, and of the by-pass just defined, can readily be made sufficient to withstand the effects of wavering pressure occasioned by an erratic feed valve. It will further be observed that only valves which have moved to restricted release and recharge position are stabilized, all others being conditioned for sensitiveness and free motion. As the stabilized valves are those located at the forward end of the train, the effect is to stabilize those valves which are near enough to the locomotive to be affected by erratic feed valve action.

The by-pass connection also serves as a convenient means for dissipating overcharges in the auxiliary reservoir. It is well understood that such overcharges occur at the forward portion of the train so that the effect is to condition for dissipation of overcharge those valves whose reservoirs are likely to be overcharged.

The charging rate to the supplemental reservoir remains unchanged and is controlled by the choke port 145. Because the slide valve 42 is not returned from restricted release position by the retard stop spring 63, the exhaust from the brake cylinder remains restricted to the capacity of the passage 137.

In a successful valve embodying the present invention it was found that approximately the first twenty eight triple valves in a train of one hundred and fifty cars, move to restricted release and recharge position.

*Start to service from normal recharge after restricted release (Fig. 6)*

When the valve starts to service position from normal recharge position after restricted release position the first movement of the piston will shift the graduating valve 43 on the slide valve 42 until the spider 53 engages the inner end of the slide valve. At this point the added frictional resistance of the slide valve, which, as explained, is rather heavily loaded, tends to produce a hesitation in the motion of the piston and to interrupt such motion. In this position the extension port 149 still registers partially with the stabilizing port 125. If the valve moves in response to a brake pipe pressure reduction initiated at the engineer's brake valve, the piston 49 will continue to move outward, but if the motion is a slight one, such as would be caused by feed valve fluctuation, or by overcharge in the auxiliary reservoirs, the parts will come to rest in the position of Fig. 6. In this position the stabilizing port is still open and will dissipate the overcharge or dissipate minor pressure differentials built up upon the piston 59 by feed valve fluctuations.

*Quick service (Fig. 7)*

In this position the piston 49 is arrested by engagement with the graduating stem 57 without compression of either graduating spring. Thus the arrest occurs only momentarily.

In quick service position the cavity 127 registers with port 112 and the cavity 131 registers with port 121. At the same time the connecting ports 126 and 129 are bridged by the cavity 147 in the graduating valve so that brake pipe air flows through port 108 past valve 95 through passage 111, port 112, and the registering ports in the slide and graduating valves to the exhaust port 121 and exhaust passage 123.

It will be observed that the exhaust passage 123 is controlled by the retainer so that if retainers are applied the effect will be to reduce the intensity of quick service venting. This is a desirable condition. It may be observed that on the first application, with retainers on, the quick service is limited to the volume in the retainer pipe. However, the normal condition is with the retainers off, and the description will be continued on the assumption that retainers are off.

In quick service position exhaust port 134 is moved out of register with brake cylinder port 118 and the extension 141 at the lower end of service port 138 has commenced to overlap the brake cylinder port 118. Since the graduating valve completely exposes the upper end of the service port 138, flow of auxiliary reservoir air to the brake cylinder commences but at the restricted rate imposed by the choke 142. The charging port to the supplemental reservoir is blanked at both ends and the slide valve seals the seat port 117. The quick service port is of quite large size so that the venting of the brake pipe is rapid to insure that the piston 49 will overpower the light graduating spring 71 and shift the stem 57 until the collar 58 engages the flange 73. When such engagement occurs the piston 49 will be again arrested and is in full service position.

*Full service position (Fig. 8)*

The cavity 127 retains its full register with the port 112 and the cavity 131 is still in partial register with port 121, while the cavity 147 connects the communicating ports 126 and 129. Consequently quick service venting flow persists but at a reduced rate as compared to the flow which occurs in quick service position.

The small loading port 135 maintains communication with the exhaust seat port 122 for the purpose of maintaining ports 133 and 134 at atmospheric pressure to load the slide valve 42 and increase its frictional resistance to motion. The service port 138 is in full register with the brake cylinder port 118 so that the maximum service flow to the brake cylinder now occurs. The rate of such flow is determined by the capacity of choke port 142. Supplemental reservoir port 117 is blanked.

When brake pipe pressure is reduced a definite amount, say five pounds, below the pressure in the supplemental reservoir 36, the quick service limiting valve 95 is closed against the resistance of the spring 103. This terminates the flow of brake pipe air to atmosphere but does not affect the flow of auxiliary reservoir air to the brake cylinder. The port areas are so chosen that the valve 95 will close while auxiliary reservoir air is still flowing to the brake cylinder. When auxiliary reservoir pressure drops to within approximately two pounds of brake pipe pressure, the light graduating spring 71 will start to shift the piston 49 inward for the full travel of the graduating stem. This positions the parts in what is known as preliminary service lap position.

*Preliminary service lap position (Fig. 9)*

In this position the graduating stem has moved the piston inward to the limit of travel of the graduating stem and in such motion only the piston and graduating valve move. The recess 147 moves out of register with the quick service port 126 so that even if valve 95 should again open, no quick service venting would occur. The inner end of the graduating valve 43 moves far enough to lap the upper end of the service extension port 138 except the tail port 139.

The cavity 131 and the ports 133 and 134 are still maintained at atmospheric pressure, and the slide valve is still in the position of Fig. 8. The effect is to load the slide valve 42 and give it added resistance against motion toward release position.

In the position of Fig. 9 flow continues from the auxiliary reservoir to the brake cylinder but at a very restricted rate so that final equalization between auxiliary reservoir and brake pipe pressure takes place at a very gradual rate and the valve is stabilized against being kicked into release position by surges of ordinary intensity in the brake pipe.

It will be readily understood that if the lapping motion occurs slowly the brake pipe pressure may rise to a certain extent at certain valves during the time the auxiliary reservoir pressure is slowly falling. Consequently the triple valve might actually lap at a higher pressure than that determined by the quick service venting reduction. The effect is to prevent an undesired release of the triple valve by retaining a slightly higher pressure in the auxiliary reservoir.

Those triple valves which are not affected by flooding flow in the brake pipe move gradually to lap position when auxiliary reservoir pressure falls slightly below brake pipe pressure.

*Service lap position (Fig. 10)*

In this position the graduating valve 43 has moved to the right until collar 54 engages the slide valve 42 closing the small tail port 139 and terminating the flow of auxiliary reservoir air to the brake cylinder.

The full capacity of the flow port 141 during the period of maximum flow from the auxiliary reservoir to the brake cylinder, and the rate of drop of brake pipe pressure occasioned by the quick service venting are specially coordinated This coordination is such that the drop in the auxiliary reservoir pressure occasioned by maximum flow to the brake cylinder, proceeds at a slower rate than the drop in brake pipe pressure, the relation being such that the piston 49 will certainly overpower the spring 71 and insure motion to full service position. The proportions further are such that upon all subsequent service reductions of brake pipe pressure the piston 49 and the graduating valve 43 will move to the left only until the piston engages the end of the graduating stem without overpowering the spring 71. Under these conditions only the tail port 139 opens for service flow, and this is sufficient to feed air to the brake cylinder fast enough to keep pace with the fastest rates of brake pipe pressure drop occasioned by brake pipe leakage or by reduction through the engineer's brake valve in the absence of quick service venting.

It will be apparent from a comparison of Figs. 8 and 10 that the slide valve 42 under service lap conditions, is in the same position which it assumed in full service position. The quick service limiting valve 95 will have closed to preclude any quick service venting after the first brake pipe reduction. It follows that in all subsequent reductions the graduating valve alone moves and moves between service lap position and a position which is substantially identical with preliminary service lap position (Fig. 9).

*Emergency position (Fig. 11)*

The first effect of a reduction of brake pipe pressure at an emergency rate is to cause the emergency vent valve 23 to operate and produce a sharp reduction of brake pipe pressure. This reduction causes the piston 49 to move to the left, overpowering both graduating springs 71 and 74 and seating on the front cap gasket. The effect is to position the slide valve and graduating valve as shown in Fig. 11. In reaching this position the valve moves through quick service position but so rapidly that the service venting is probably negligible in its effect. The brake cylinder exhaust is interrupted as clearly indicated in the drawings. The supplemental reservoir port 117 is completely exposed so that the supplemental reservoir as well as the auxiliary reservoir is directly connected to the slide valve chamber. The emergency port 146 moves into communication with the brake cylinder port 118 and pressures in the two reservoirs and brake cylinder approximately equalize, giving the maximum attainable braking force.

As has already been suggested, it is feasible to interpose in the path of flow of air from the brake cylinder port 118 to the brake cylinder any of the various mechanisms heretofore devised to control the rate of rise of pressure in the brake cylinder. As such a device does not affect the functioning of those features which are here claimed as novel, it is not necessary to discuss this possibility further, and it is mentioned merely to negative any assumption that the use of such pressure control mechanism is impracticable with the triple valve here disclosed.

*Preliminary emergency lap (Fig. 12)*

If for any reason it is desirable to drain the brake system of pressure fluid after an emergency application, the bleed valve or release valve 40 on the auxiliary reservoir is opened manually. This reduces the pressure in the slide valve chamber with the result that air from the supplemental reservoir flows back to the slide valve chamber and thence through the auxiliary reservoir to atmosphere. When the pressure in the system is reduced to a given value, here assumed to be about fourteen pounds gage, the tension of the graduating spring 74, assisted by the tension of the graduating spring 71, will force the piston 49 to the right until the collar 73 seats on the stop 69. This will move the graduating valve and the slide valve to the position shown in Fig. 12 in which position the emergency port 146 registers with approximately half the exposed area of the brake cylinder port 118, and the seat port 117 remains fully exposed. Consequently the flooding action through the auxiliary reservoir may continue, and will continue until the pressure is so low that the light graduating spring 71 will move the piston and the valve to a secondary lap position.

*Secondary emergency lap position (Fig. 13)*

Figure 13:
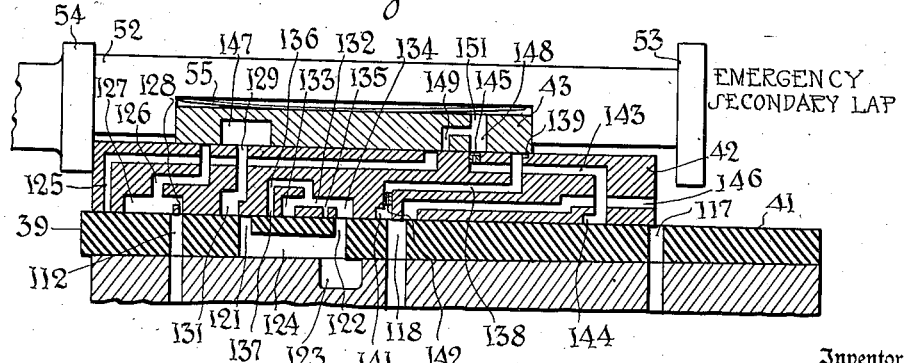
Fig. 13 is a similar view showing secondary emergency lap position, which, strictly speaking, is not a true lap position, for the reason that both reservoirs remain connected with the brake cylinder.

The motion just described positions the parts as shown in Fig. 13, and as will readily be observed, the position is not a true lap position, for the reason that the emergency port 146 still slightly overlaps the brake cylinder port 118 and the supplemental reservoir port 117 is still about half exposed. Consequently the bleeding of the brake cylinder and supplemental reservoir may continue through the auxiliary reservoir and its bleed valve.

Figure 12:
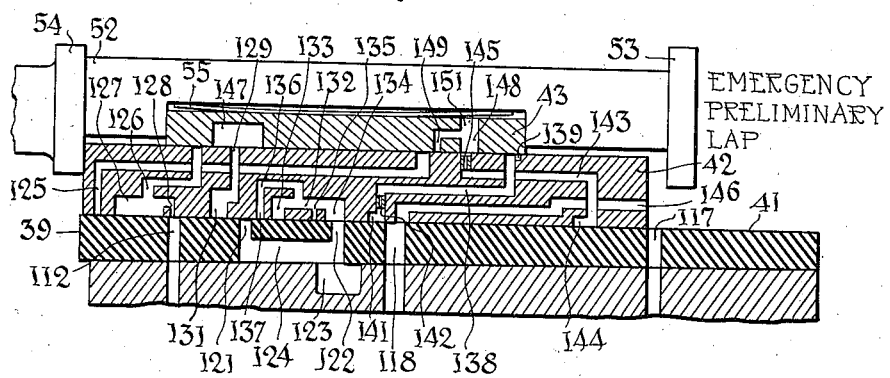
Fig. 12 is a similar view showing the preliminary emergency lap position.

The two emergency lap positions of Figs. 12 and 13 derive their primary importance from the bleeding operation, and it is not necessary to discuss the action of the valve in moving from emergency position to the recharge and release positions already set forth.

While I have described the construction of the triple valve and the porting of the slide and graduating valve with extreme particularity, in order to disclose that arrangement which in practice has secured highly desirable results, the fact that various modifications and rearrangements are possible is fully recognized and no limitation to the express details disclosed is implied beyond those limitations expressly stated in the claims.

While the device was developed for use with a two reservoir system, many of the features of advantage above disclosed are useful in single reservoir systems, and it may be so applied by the simple omission of ports controlling flow to and from the supplemental reservoir.

What is claimed is,—

1. The combination with a triple valve of the type including a piston and a slide valve having lost motion relatively to the piston, said triple valve having an abnormal charging position to which the piston and slide valve move upon an abnormal rise of brake pipe pressure, and from which the piston returns leaving the slide valve in abnormal position, of ports effective when the triple valve is in such abnormal position and serving to load said slide valve and increase its frictional resistance to motion.

2. The combination with a triple valve of the type including a triple piston and having a normal charging position and an abnormal charging position, to which last the triple valve is moved by excessive brake pipe pressure, of means rendered effective by motion of the triple valve to said abnormal and back to said normal position to open a normally closed by-pass around said triple piston and to increase the resistance of said triple valve to motion.

3. The combination with a triple valve of the type including a triple piston and a slide valve actuated by the piston with lost motion, said piston and slide valve having a normal charging and release position and an abnormal charging and release position to which said piston and valve are moved by an abnormal rise of brake pipe pressure and from which the piston returns to normal position leaving the slide valve in abnormal position, of means rendered effective by such return of the piston to normal position to open a by-pass around said triple piston through said slide valve and to subject a substantial portion of the lower face of the slide valve to a low pressure whereby the valve is loaded and its frictional resistance to motion is increased.

4. In a triple valve, the combination of a slide valve chamber having a slide valve seat; a slide valve on said seat; a graduating valve; a triple piston subject on one side to brake pipe pressure and on the other to pressure in said slide valve chamber, said piston being arranged to actuate said valves and having lost motion relatively to said slide valve; a yielding retard stop reacting against motion of the piston and serving when brake pipe pressure rise is normal to arrest the piston and valves in normal position, but capable of yielding under abnormal rise of brake pipe pressure to permit the piston and valves to move to abnormal position, and thereafter serving to restore the piston and graduating valve to normal position, while the slide valve remains in abnormal position; there being coacting ports in said seat and slide valve, and controlled by said graduating valve, said ports being arranged to expose, in the last-named position, a substantial area of the lower face of said slide valve to atmospheric pressure, whereby the slide valve is loaded and its frictional resistance to motion increased.

5. In a triple valve, the combination of a slide valve chamber having a slide valve seat; a slide valve on said seat; a graduating valve; a triple piston subject on one side to brake pipe pressure and on the other to pressure in said slide valve chamber, said piston being arranged to actuate said valves and having lost motion relatively to said slide valve; a yielding retard stop reacting against motion of the piston and serving when brake pipe pressure is normal to arrest the piston and valves in normal position, but capable of yielding under abnormal rise of brake pipe pressure to permit the piston and valves to move to abnormal position, and thereafter serving to restore the piston and graduating valve to normal position, while the slide valve remains in abnormal position; there being coacting ports in said seat and slide valve, and controlled by said graduating valve, said ports functioning, in the last-named position, to open a passage from the slide valve chamber to the brake pipe and to subject a substantial area of the lower face of said slide valve to a low pressure to load the slide valve and increase its frictional resistance to motion.

6. In a triple valve, the combination of a slide valve chamber having a slide valve seat; a slide valve on said seat; a graduating valve; a triple piston subject on one side to brake pipe pressure and on the other to pressure in said slide valve chamber, said piston being arranged to actuate said valves and having lost motion relatively to said slide valve; a yielding retard stop reacting against motion of the piston and serving when brake pipe pressure is normal to arrest the piston and valves in normal position, but capable of yielding under abnormal rise of brake pipe pressure to permit the piston and valves to move to abnormal position, and thereafter serving to restore the piston and graduating valve to normal position, while the slide valve remains in abnormal position; there being coacting ports in said seat and slide valve, and controlled by said graduating valve, said ports functioning in the last-named position, to open a passage from the slide valve chamber to the brake pipe and to subject a substantial area of the lower face of said slide valve to a low pressure to load the slide valve and increase its frictional resistance to motion; and secondary valve means responsive to brake pipe pressure and controlling the last-named passage.

7. In a triple valve, the combination of a slide valve chamber having a valve seat and adapted for connection with an auxiliary reservoir; a slide valve on said seat; a graduating valve; a triple piston subject on one side to brake pipe pressure and on the other to pressure in the slide valve chamber, said piston being arranged to actuate said valves and having lost motion relatively to said slide valve; and a yielding retard stop reacting against motion of the piston and serving when brake pipe pressure rises normally to arrest the piston and both valves in normal position, but capable of yielding under abnormal rise of brake pipe pressure to permit the piston and valves to move to abnormal position, and thereafter serving to shift the piston and graduating valve to normal position, the slide valve remaining in abnormal position; there being in said seat a quick service port leading from the brake pipe and a quick service port leading to atmosphere, and corresponding ports in the slide valve controlled by a port in the graduating valve, said ports in the slide valve being enlarged at their lower ends, the ports above-named serving in quick service position to connect the quick service ports in the seat together, the ports being so arranged that when the graduating valve is in normal and the slide valve in abnormal position, the enlargements in the lower ends of the quick service ports in the slide valve are connected together and to atmosphere.

8. In a triple valve, the combination of a slide valve chamber having a valve seat and adapted for connection with an auxiliary reservoir; a slide valve on said seat; a graduating valve; a triple piston subject on one side to brake pipe pressure and on the other to pressure in the slide valve chamber, said piston being arranged to actuate said valves and having lost motion relatively to said slide valve; and a yielding retard stop reacting against motion of the piston and serving when brake pipe pressure rises normally to arrest the piston and both valves in normal position, but capable of yielding under abnormal rise of brake pipe pressure to permit the piston and valves to move to abnormal position, and thereafter serving to shift the piston and graduating valve to normal position, the slide valve remaining in abnormal position; there being in said seat a brake pipe quick service port and an atmospheric quick service port, and there being in the slide valve a stabilizing port controlled by the graduating valve, and two quick service ports having enlargements at their lower ends and capable of being connected together by a port in the graduating valve, the last-named ports being connected together in quick service position and then registering with the brake pipe and atmospheric quick service ports in the seat, and when the graduating valve is in normal and the slide valve in abnormal position said stabilizing port registering with the brake pipe quick service port in the seat, and said quick service ports in the slide valve being connected together by the port in the graduating valve and being in communication with the atmospheric quick service port.

9. A triple valve adapted for connecting with a brake pipe, brake cylinder, and auxiliary reservoir, and having a plurality of release positions, said valve including a passage additional to the reservoir charging passage, connecting the brake pipe and auxiliary reservoir, and open in one of said release positions only, said valve further including means serving in the last-named release position to increase its resistance to motion.

10. A triple valve adapted for connection with a brake pipe, brake cylinder, and auxiliary reservoir, and having a normal recharge and release position, a restricted recharge and release position, and a normal recharge position to which the valve moves from restricted release and recharge position, said valve including a passage additional to the charging passage and open only in the last-named normal recharge position to connect the brake pipe and auxiliary reservoir, said valve including means effective in the last-named normal recharge position to increase its resistance to motion.

11. A triple valve adapted for connection with a brake pipe, brake cylinder, and auxiliary reservoir, and having three release and recharge positions, the first of which is initially assumed by triple valves adjacent the engineer's brake valve, the second of which is assumed by the remaining valves in the train, and the third of which is subsequently assumed by those valves which move to the first release position, said valves including stabilizing ports distinct from the reservoir charging passage and opened by motion of the valves to said third position to connect the brake pipe and auxiliary reservoir, said valve including means effective in said third position to increase its resistance to motion.

12. The combination with a triple valve as defined in claim 11 of a normally open quick service limiting valve controlling flow through said stabilizing ports; and an actuator for said limiting valve subject to brake pipe pressure and arranged to close said limiting valve upon a definite reduction of brake pipe pressure.

13. In a triple valve adapted for connection with a brake pipe, brake cylinder, and auxiliary reservoir, the combination of a valve unit comprising a triple piston, triple slide valve, and graduating valve, the triple piston controlling a reservoir charging port, the slide valve controlling release of the brakes, and the slide valve and graduating valve conjointly controlling flow from the auxiliary reservoir to the brake cylinder, the triple piston actuating said valves and having lost motion relatively to one thereof; and a yielding retard stop reacting against the triple piston in release position, said valve unit including ports controlled by said valves and opened upon motion of said piston against the resistance of said retard stop and back under the urge of said retard stop to connect said reservoir and brake pipe independently of said reservoir charging port and to expose a substantial area of the under face of said slide valve to atmospheric pressure.

14. In a triple valve, the combination of a slide valve chamber having a slide valve seat; a slide valve on said seat; a graduating valve; a triple piston subject on one side to brake pipe pressure and on the other to pressure in said slide valve chamber, said piston being arranged to actuate said valves and having lost motion relatively to said slide valve; a yielding retard stop reacting against motion of the piston and serving when brake pipe pressure is normal to arrest the piston and valves in normal position, but capable of yielding under abnormal rise of brake pipe pressure to permit the piston and valves to move to abnormal position, and thereafter serving to restore the piston and graduating valve to normal position, while the slide valve remains in abnormal position, such restoring motion consuming only a part of the lost motion between the piston and slide valve; there being coacting ports in said seat and slide valve and controlled by said graduating valve, said ports functioning in the last named position and also when the piston has moved outward to the limit of its lost motion relatively to the slide valve to open a by-pass between the brake pipe and the slide valve chamber.

15. In a triple valve, the combination of a slide valve chamber having a slide valve seat; a slide valve on said seat; a graduating valve; a triple piston subject on one side to brake pipe pressure and on the other to pressure in said slide valve chamber, said piston being arranged to actuate said valves and having lost motion relatively to said slide valve; a yielding retard stop reacting against motion of the piston and serving when brake pipe pressure is normal to arrest the piston and valves in normal position, but capable of yielding under abnormal rise of brake pipe pressure to permit the piston and valves to move to abnormal position, and thereafter serving to restore the piston and graduating valve to normal position, while the slide valve remains in abnormal position, such restoring motion consuming only a part of the lost motion between the piston and slide valve; there being coacting ports in said seat and slide valve and controlled by said graduating valve, said ports functioning in the last named position and also when the piston has moved outward to the limit of its lost motion relatively to the slide valve to open a by-pass between the brake pipe and the slide valve chamber and to subject a substantial area of the lower face of said slide valve to a low pressure to load the slide and increase its frictional resistance to motion.

16. In a triple valve, the combination of a slide valve chamber having a slide valve seat; a slide valve on said seat; a graduating valve; a triple piston subject on one side to brake pipe pressure and on the other to pressure in said slide valve chamber, said piston being arranged to actuate said valves and having lost motion relatively to said slide valve; a yielding retard stop reacting against motion of the piston and serving when brake pipe pressure is normal to arrest the piston and valves in normal position, but capable of yielding under abnormal rise of brake pipe pressure to permit the piston and valves to move to abnormal position, and thereafter serving to restore the piston and graduating valve to normal position, while the slide valve remains in abnormal position, such restoring motion consuming only a part of the lost motion between the piston and slide valve; there being coacting ports in said seat and slide valve, and controlled by said graduating valve, offering a passage, fully open in the last named position, and partially open when the piston moves outward to the limit of said lost motion, said passage connecting the brake pipe and said slide valve chamber.

17. A triple valve for use with a brake pipe, auxiliary reservoir, and brake cylinder, said valve including a piston and a valve mechanism, said valve mechanism having a quick service vent port and a service port controlling flow from the auxiliary reservoir to the brake cylinder; and a quick service limiting valve controlling flow through the quick service vent port, actuated by a reduction of brake pipe pressure, and arranged to close when brake pipe pressure is reduced a definite amount; the flow capacities of said quick service vent port and said service port being so related that quick service venting will reduce brake pipe pressure at a rate faster than the rate of reduction of auxiliary reservoir pressure by flow through the service port to the brake cylinder.

18. A triple valve for use with a brake pipe, auxiliary reservoir, and brake cylinder, said valve including a piston and a valve mechanism, said valve mechanism having a quick service vent port controlling flow from the brake pipe to atmosphere and a service port controlling flow from the auxiliary reservoir to the brake cylinder; a quick service limiting valve controlling flow through the quick service vent port, actuated by a reduction of brake pipe pressure, and arranged to close when brake pipe pressure is reduced a definite amount; the flow capacities of said quick service vent port and said service port being so related that quick service venting will reduce brake pipe pressure at a rate faster than the rate of reduction of auxiliary reservoir pressure by flow through the service port to the brake cylinder.

19. A triple valve for use with a brake pipe, auxiliary reservoir, and brake cylinder, said valve including a piston and a valve mechanism actuated thereby, said valve mechanism having a quick service vent port controlling flow from the brake pipe to atmosphere, and a service port controlling flow from the auxiliary reservoir to the brake cylinder; a yielding graduating stop adapted to arrest said piston temporarily in quick service position and to yield to permit the piston to move to full service position; and a quick service limiting valve controlling flow through the quick service vent port, actuated by reduction of brake pipe pressure, and arranged to close when brake pipe pressure is reduced a definite amount; the flow capacities of said quick service vent port and said service port and the yielding resistance of said graduating stop being so coordinated that quick service venting will reduce the brake pipe pressure at a rate sufficiently faster than the rate of reduction of the auxiliary reservoir pressure by flow through the service port to the brake cylinder, to insure that the piston will overpower the graduating stop and move to full service position if it reaches quick service position.

20. The combination of claim 19, further characterized in that the triple valve is arranged to charge a supplemental reservoir in addition to the auxiliary reservoir and has an emergency position beyond said full service position in which said supplemental reservoir as well as the auxiliary reservoir is connected to the brake cylinder, said yielding graduating stop having a point in its yielding motion at which its resistance is materially increased, and at which the valve is in full service position, said stop being capable of yielding further to permit the piston to shift the triple valve into emergency position upon emergency reduction of brake pipe pressure.

21. A triple valve comprising in combination a triple piston; a slide valve and a graduating valve both actuated by said piston, the slide valve having lost motion relatively to the piston, said slide valve having a service port controlled by said graduating valve and a quick service port also controlled by said graduating valve, said quick service port controlling flow from the brake pipe to atmosphere; said triple valve having a quick service position in which the service port is partially open and the quick service port is open, and a full service position in which the service port is open and the quick service port is partially open; and a quick service limiting valve controlling said quick service port, actuated by brake pipe pressure and arranged to close when brake pipe pressure has been reduced a definite amount.

22. A triple valve comprising in combination a triple piston; a slide valve and a graduating valve both actuated by said piston and the slide valve having lost motion relatively to the piston, said slide valve having a service port controlled by said graduating valve and a quick service port also controlled by said graduating valve, said quick service port controlling flow from the brake pipe to atmosphere; said triple valve having a quick service position in which the service port is partially open and the quick service port is open, and a full service position in which the service port is open and the quick service port is partially open; a yielding graduating stop adapted to arrest said triple valve in quick service position and capable of yielding to permit it to move to full service position; and a quick service limiting valve controlling flow through said quick service port, responsive to brake pipe pressure and arranged to close when brake pipe pressure is reduced a definite amount.

23. A triple valve comprising in combination a triple piston; a slide valve and a graduating valve both actuated by said piston, the slide valve having lost motion relatively to the piston, said slide valve having a service port controlled by said graduating valve and a quick service port also controlled by said graduating valve, said quick service port controlling flow from the brake pipe to atmosphere; said triple valve having a quick service position in which the service port is partially open and the quick service port is open, and a full service position in which the service port is open and the quick service port is partially open; a yielding graduating stop adapted to arrest said triple valve in quick service position and capable of yielding to permit it to move to full service position; and a quick service limiting valve controlling flow through said quick service port actuated by brake pipe pressure and arranged to close when brake pipe pressure is reduced a definite amount; the relative capacities of said service port and quick service port in quick service position being so coordinated with the resistance of the yielding graduating stop, that the venting of the brake pipe through the quick service port will insure motion of the triple valve to full service position if it reaches quick service position.

24. The combination of claim 23, further characterized in that the motion of the graduating stop is so limited that when the triple valve is moved by the graduating stop toward lap position upon approach to equalization of auxiliary reservoir and brake pipe pressures, the graduating stop will cease to react upon the triple piston at a position in which the graduating valve partially closes the service port in the slide valve.

25. The combination of claim 23, further characterized in that the graduating valve and slide valve coact to control a restricted extension of the service port, and the motion of the graduating stop is so limited that when the graduating stop shifts the triple piston toward lap position upon approach to equalization between brake pipe and auxiliary reservoir pressures, the graduating stop will cease to react upon the piston when the latter is in a position in which the graduating valve exposes such extension of the service port, the triple valve being capable thereafter of moving to complete lap position upon the reduction of the auxiliary reservoir pressure somewhat below brake pipe pressure.

26. A triple valve comprising in combination a triple piston; a slide valve and a graduating valve, the slide valve having lost motion relatively to the piston and both valves being actuated by the piston, said slide valve having a service port controlled by the graduating valve and a quick service port also controlled by the graduating valve, the valves being shifted by the piston to a quick service position in which the service port is partially open and the quick service port is open, then further to a service position in which the service port is open and the quick service port is at least partially open, and by return motion of the piston and graduating valve to a lap position in which the quick service port and the service port are both closed; and a yielding graduating stop adapted to arrest the triple valve in quick service position, said graduating stop serving to assist in restoring the piston and graduating valve to a point at which the quick service port is closed and the service port is throttled.

27. The combination of claim 26, further characterized in that the quick service port controls flow from the brake pipe to atmosphere; and valve means independent of the triple piston and its related valves are provided for limiting the outflow through the quick service port.

28. The combination defined in claim 26, further characterized in that the quick service port leads from the brake pipe to atmosphere and a quick service limiting valve controlling the flow through said port and actuated in a closing direction by a definite reduction of brake pipe pressure is provided.

29. A triple valve comprising in combination a triple piston; a slide valve having a lost motion connection with said piston; a graduating valve actuated by said piston, said slide valve having a service port formed with a restricted extension, said port and extension being controlled by the graduating valve, said slide valve also having a quick service port controlled by the graduating valve and leading to atmosphere; means responsive to brake pipe pressure for terminating flow to atmosphere through said quick service port when brake pipe pressure has been reduced a definite amount; and a yielding graduating stop adapted to coact with said triple piston, the triple valve having a quick service position in which the piston engages the graduating stop without overpowering it, and in which said service port is at least partially open and said quick service port is open, a full service position in which the graduating stop is overpowered and in which said service port is open and said quick service port is partially open, a preliminary service lap position in which the triple piston has been shifted to the limit of motion of the graduating stop toward release position, and in which the graduating valve closes the quick service port and closes said service port except for said restricted extension.

30. A triple valve comprising in combination a triple piston; a slide valve having a lost motion connection therewith; a graduating valve actuated by said piston, said slide valve having a service port formed with a restricted extension, said port and extension being controlled by the graduating valve, said slide valve also having a quick service port controlled by the graduating valve and capable of establishing quick service flow to atmosphere; means responsive to a definite reduction of brake pipe pressure and serving to terminate such quick service flow; and a yielding graduating stop adapted to coact with said triple piston, the triple valve having a quick service position in which the piston engages the graduating stop without overpowering it, and in which said service port is at least partially open and said quick service port is open, a full service position in which the graduating stop is overpowered and in which said service port is open and said quick service port is at least partially open, a preliminary service lap position in which the piston has been shifted to the limit of motion of the graduating stop toward release position, and in which the graduating valve closes the quick service port and said service port except for said restricted extension, and a lap position in which the graduating valve closes the quick service port and the service port, the slide valve remaining substantially at rest in the motion of the triple valve from full service position to lap position.

31. A triple valve comprising in combination a triple piston; slide valves actuated thereby and adapted in emergency position to connect an auxiliary reservoir and a supplemental reservoir with a brake cylinder; and a graduating stem adapted to shift said triple valve from emergency toward release position, the range of action of said graduating stem and the location of the ports connecting the brake cylinder and the reservoirs being so coordinated that as the graduating stem shifts the triple valve during bleeding of the auxiliary reservoir after an emergency application, the connection through said ports will be maintained to and including the final position to which said graduating stem moves the triple valve.

CHARLES A. CAMPBELL.